(12) United States Patent
Liu et al.

(10) Patent No.: US 12,726,098 B2
(45) Date of Patent: Sep. 1, 2026

(54) VIBRATION MOTOR WITH A CLOSED-LOOP MAGNETIC CIRCUIT

(71) Applicant: TOPRAY MEMS INC., Hsinchu City (TW)

(72) Inventors: Chin-Sung Liu, Hsinchu City (TW); Hsiao-Ming Chien, Hsinchu City (TW); Chi-Ling Chang, Hsinchu City (TW)

(73) Assignee: TOPRAY MEMS INC., Hsinchu City (TW)

( * ) Notice: Subject to any disclaimer, the term of this patent is extended or adjusted under 35 U.S.C. 154(b) by 150 days.

(21) Appl. No.: 18/950,266

(22) Filed: Nov. 18, 2024

(65) Prior Publication Data

US 2026/0121499 A1 Apr. 30, 2026

(30) Foreign Application Priority Data

Oct. 28, 2024 (TW) ................................ 113141098

(51) Int. Cl.
*H02K 33/18* (2006.01)
*H02K 33/00* (2006.01)

(52) U.S. Cl.
CPC ............ *H02K 33/18* (2013.01); *H02K 33/00* (2013.01)

(58) Field of Classification Search
CPC ........ H02K 33/00; H02K 33/18; H02K 33/16; H02K 33/02; H02K 33/04; H02K 33/06; H02K 33/10; H02K 33/12; H02K 33/14
USPC ................................ 310/12.01, 12.21, 12.24
See application file for complete search history.

(56) References Cited

U.S. PATENT DOCUMENTS

2014/0152126 A1* 6/2014 Kim ........................ B06B 1/045 310/25

* cited by examiner

*Primary Examiner* — Alexander A Singh

(57) ABSTRACT

The present invention provides a vibration motor with a closed-loop magnetic circuit, comprising a motor body, which further comprising: a stator fixed seat, a stator yoke, and a flexible circuit board; a mover, further comprising: a mover carrier, a magnet; and a mover yoke; and a suspension device, further comprising: an elastic support element and a fixed element. The flexible circuit board provides a current to the coil group, and cooperates with a magnetic field of the mover generated by the magnet to form an electromagnetic thrust to move the mover; and the stator yoke forms a stator yoke projection surface on the magnet surface of the corresponding magnet, and the area of the stator yoke projection surface is smaller than the area of the corresponding magnet surface.

8 Claims, 7 Drawing Sheets

Motor thrust(N/A) Magnetic attraction force(N)

VIBRATION MOTOR WITH A CLOSED-LOOP MAGNETIC CIRCUIT

CROSS-REFERENCE TO RELATED APPLICATION

This application claims the priority of Taiwanese patent application No. 113141098, filed on Oct. 28, 2024, which is incorporated herewith by reference.

BACKGROUND OF THE INVENTION

1. Field of the Invention

The present invention relates generally to the field of vibration motors, and more particularly, to vibration motors with a closed-loop magnetic circuit structure.

2. The Prior Arts

With the development of touch devices, the touch screens gradually replace traditional buttons on portable devices, allowing the portable device to have more space for the screen and thus increase the screen-to-body ratio. However, after the buttons were completely replaced, the shortcoming of the touch screen that could not provide tactile feedback gradually surfaced. In order to enhance user experience, portable device manufacturers have begun to study how to use vibration motors to provide users with touch feedback on touch devices.

Traditional vibration motors can be divided into two main categories: rotor motors and linear motors. Rotor motors generate vibrations by rotating asymmetric cams; linear motors generate vibrations by moving the mover back and forth in a specific direction. Since the linear motor does not need to rotate, there is no start-up delay and the linear motors to give more immediate and faster vibration feedback. Also, by controlling the current, a linear motor can control the magnitude of the Lorentz Force generated by the magnetic field, thereby producing a stronger vibration feeling.

A linear motor is a motor based on staggered placement of different magnetic poles in a straight line to form an environmental magnetic field, and uses coils and the air gap between the coils and the magnetic poles to enable relative movement of the mover. Since the Lorentz force is positively correlated with the intensity of the environmental magnetic field, increasing the intensity of the environmental magnetic field can effectively increase the vibration sensation. The magnetic field strength is essentially a specific manifestation of the magnetic field line density. To increase the magnetic field strength is equivalent to increasing the magnetic field line density. In general, in order to increase the magnetic field lines, more magnets can be added; or the local magnetic resistance can be reduced to increase the local magnetic field line density.

Under the premise of making portable products lighter and thinner, in order to reduce the volume occupied by the vibration motor and effectively utilize the magnetic field, most manufacturers use additional magnetic permeable materials, such as, yokes to reduce local magnetic resistance and to converge closer the magnetic lines of force to form a closed loop magnetic circuit so as to increase the intensity of the environmental magnetic field. However, the yoke itself will also be attracted by the magnet, thereby generating magnetic attraction, which will place an unnecessary burden on the suspension device that maintains the air gap.

In view of the limitations of the conventional vibration motor's magnetic field strength due to the thinning of the product and the disadvantage of increasing the burden of the yoke on the suspension device, the present invention aims to address the above problems

SUMMARY OF THE INVENTION

A primary objective of the present invention is to reduce the suction force generated by the yoke, thereby reducing the burden caused by the yoke on the suspension device.

Another objective of the present invention is to find the most efficient vibration motor with closed-loop magnetic circuit between the thrust raised and the suction force generated by the stator yoke by adjusting the relative position of the stator yoke and the magnet.

The vibration motor with closed-loop magnetic circuit of the present invention has a motor body, comprising: a stator fixed seat, further comprising: a coil group, disposed inside the stator fixed base; a stator yoke, made of magnetically permeable material, connected to the stator fixed base, and disposed on one side of the coil group; and a flexible circuit board, electrically connected to the coil group to supply and distribute current to the coil group; a mover, disposed on the other side of the coil group relative to the stator yoke, and further comprising: a mover carrier, connected to the stator fixed seat through a suspension device; a magnet, connected to the mover carrier, a side of the magnet near the coil group forming a magnet surface; and a mover yoke, disposed on the side of the mover carrier away from the coil group; and the suspension device, further comprising: an elastic support element, with one end connected to the mover carrier to enable the mover to move back- and forth with respect to the stator fixed seat; and a fixed element, fixedly connected to the other end of the elastic support element and the stator fixed seat, and forming a gap between the mover and the coil group.

In a preferred embodiment of the present invention, the flexible circuit board provides a current to the coil group, and cooperates with a magnetic field of the mover generated by the magnet to form an electromagnetic thrust to move the mover; and stator yoke forms a stator yoke projection surface on the magnet surface of the corresponding magnet, and the area of the stator yoke projection surface is smaller than the area of the corresponding magnet surface.

In a preferred embodiment of the present invention, the stator yoke projection surface can be located inside the magnet surface of the corresponding magnet to reduce the suction force between the stator yoke and the magnet.

In a preferred embodiment of the present invention, the geometric center of the stator yoke projection surface overlaps the geometric center of the magnet surface to reduce the suction force between the stator yoke and the magnet.

In a preferred embodiment of the present invention, the number of magnets is plural, the magnets are arranged in the same direction, and the adjacent magnet surfaces have opposite magnetic poles.

In a preferred embodiment of the present invention, there is no direct contact between adjacent magnets.

In a preferred embodiment of the present invention, the magnetization direction of the magnet is perpendicular to the surface of the magnet.

In a preferred embodiment of the present invention, the elastic support element can be a flat strip spring.

In a preferred embodiment of the present invention, the flexible circuit board has an electronic control processing unit for receiving external signals and adjusting the magnitude and flow direction of the current.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
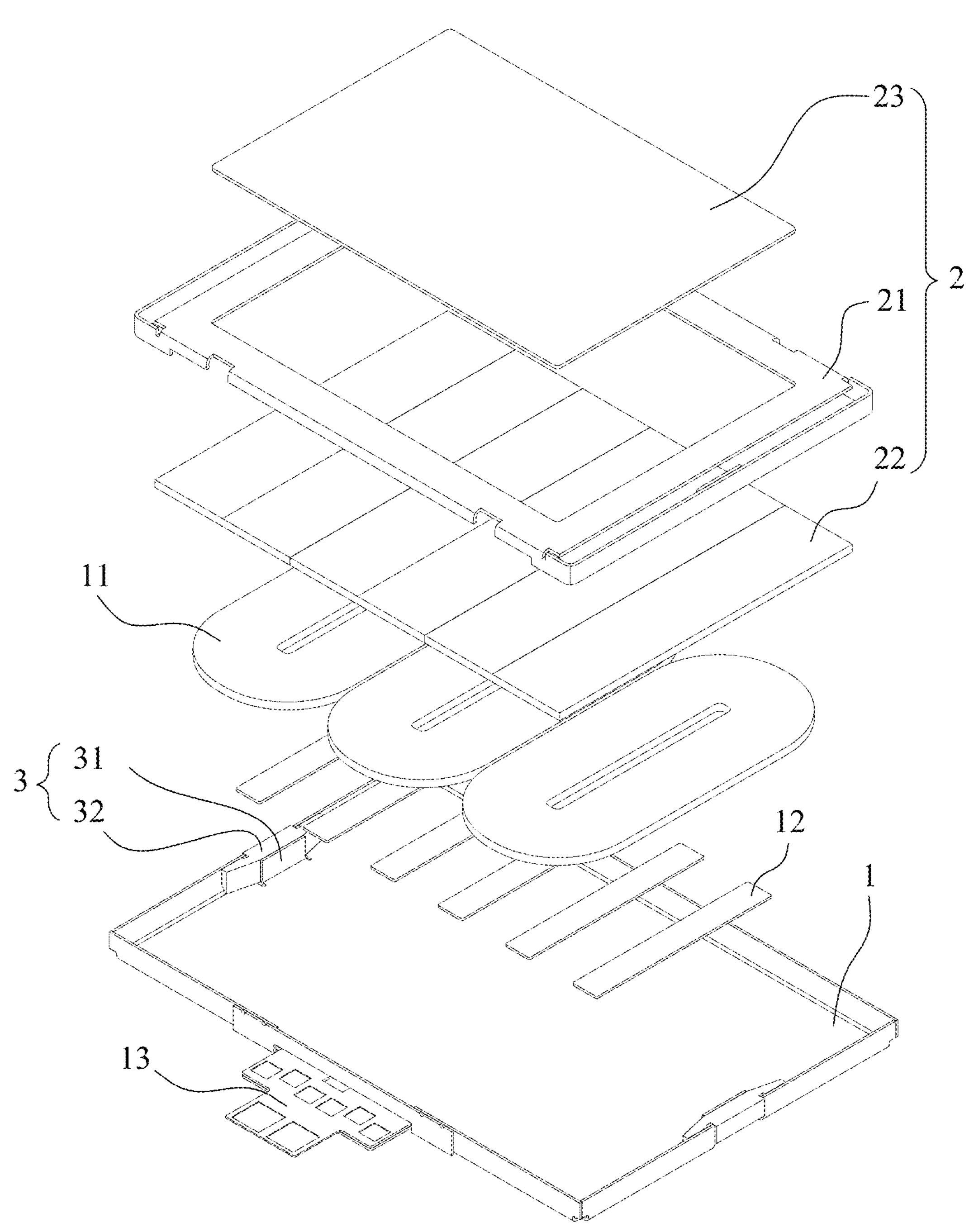
FIG. 1 is a schematic diagram of an embodiment of the present invention.

The accompanying drawings are included to provide a further understanding of the invention, and are incorporated in and constitute a part of this specification. The drawings illustrate embodiments of the invention and, together with the description, serve to explain the principles of the invention.

FIGS. 1 to 7 are schematic diagrams of embodiments of the present invention. As shown in the exploded perspective view of the embodiment of the present invention in FIG. 1, the vibration motor with closed-loop magnetic circuit of the present invention has a motor body, including: a stator fixed seat 1, a mover 2, and a suspension device 3. The stator fixed seat 1 includes: a coil group 11, a stator yoke 12, and a flexible circuit board 13, wherein the coil group 11 is disposed inside the stator fixed seat 1; the stator yoke 12 is disposed on one side of the coil group 11 and is connected to the stator fixed seat 1. The stator yoke 12 is made of magnetically permeable material. The flexible circuit board 13 is electrically connected to the coil group 11 for supplying and distributing current to the coil group 11.

Figure 2:
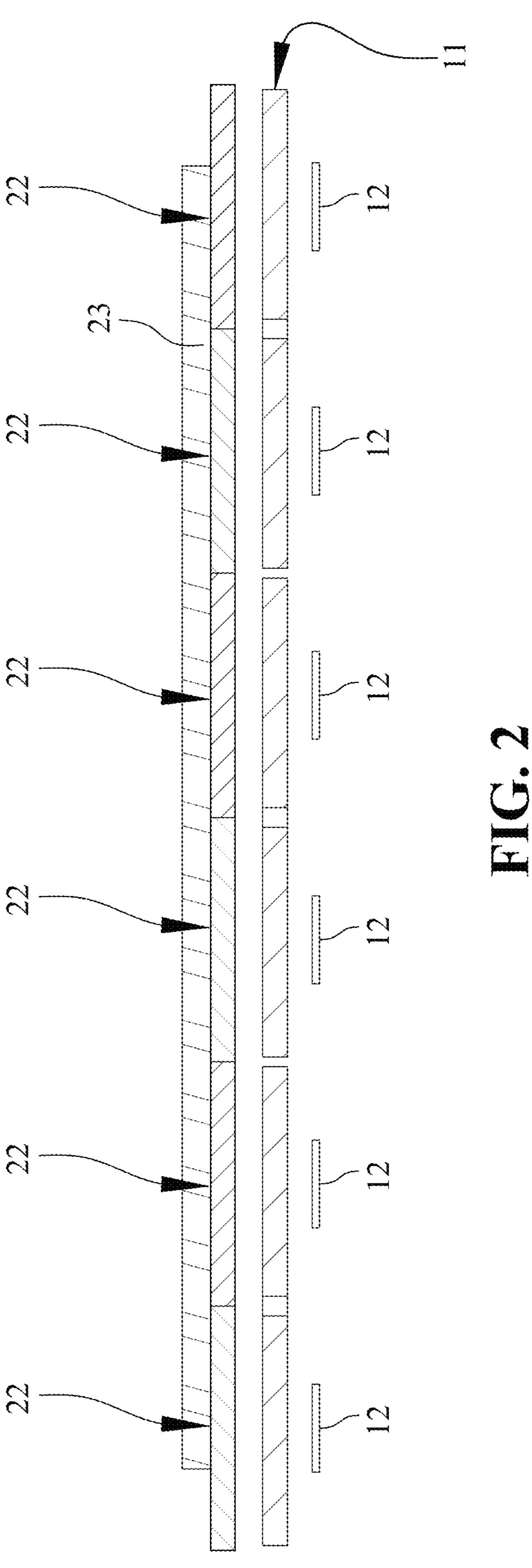
FIG. 2 is a schematic structural diagram of an embodiment of the present invention.

As shown in the structural schematic diagrams of the embodiment of the present invention in FIGS. 1 and 2, the mover 2 is disposed on the other side of the coil group 11 with respect to the stator yoke 12, and includes: a mover carrier 21, a magnet 22 and a mover yoke 23. Wherein, the mover carrier 21 is connected to the stator fixed seat 1 through the suspension device 3. The magnet 22 is connected to the mover carrier 21 and generates a magnetic field of the mover. The mover yoke 23 is disposed on the side of the mover carrier 21 away from the coil group 11.

The suspension device 3 includes: an elastic support element 31 and a fixed element 32. One end of the elastic support element 31 is connected to the mover carrier 21; the fixed element 32 is connected to the other end of the elastic support element 31 and the stator fixed seat 1 to maintain the distance between the stator fixed seat 1 and the mover 2, so that a gap is maintained between the mover 2 and the coil group 11.

In a preferred application, the flexible circuit board 13 provides a current to the coil group 11, and cooperates with a mover magnetic field generated by the magnet 22 to form an electromagnetic thrust to displace the mover 2.

In a preferred embodiment of the present invention, there is a plurality of magnets 22, the magnets 22 are arranged in the same direction, and the magnetic poles of two adjacent magnet surfaces 220 are opposite to each other.

Figure 3:
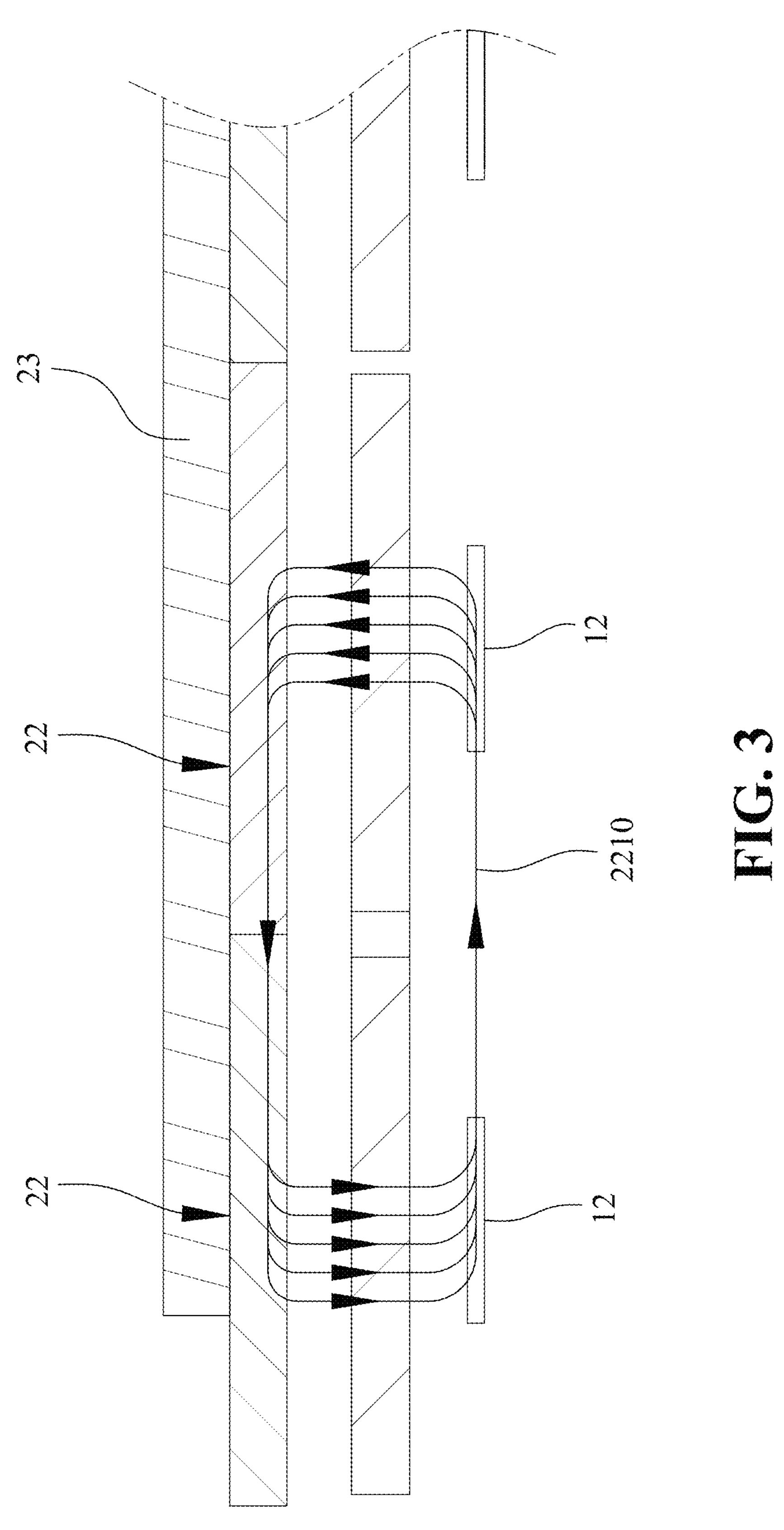
FIG. 3 is a schematic diagram of an approximately closed-loop magnetic circuit according to an embodiment of the present invention.
Figure 4:
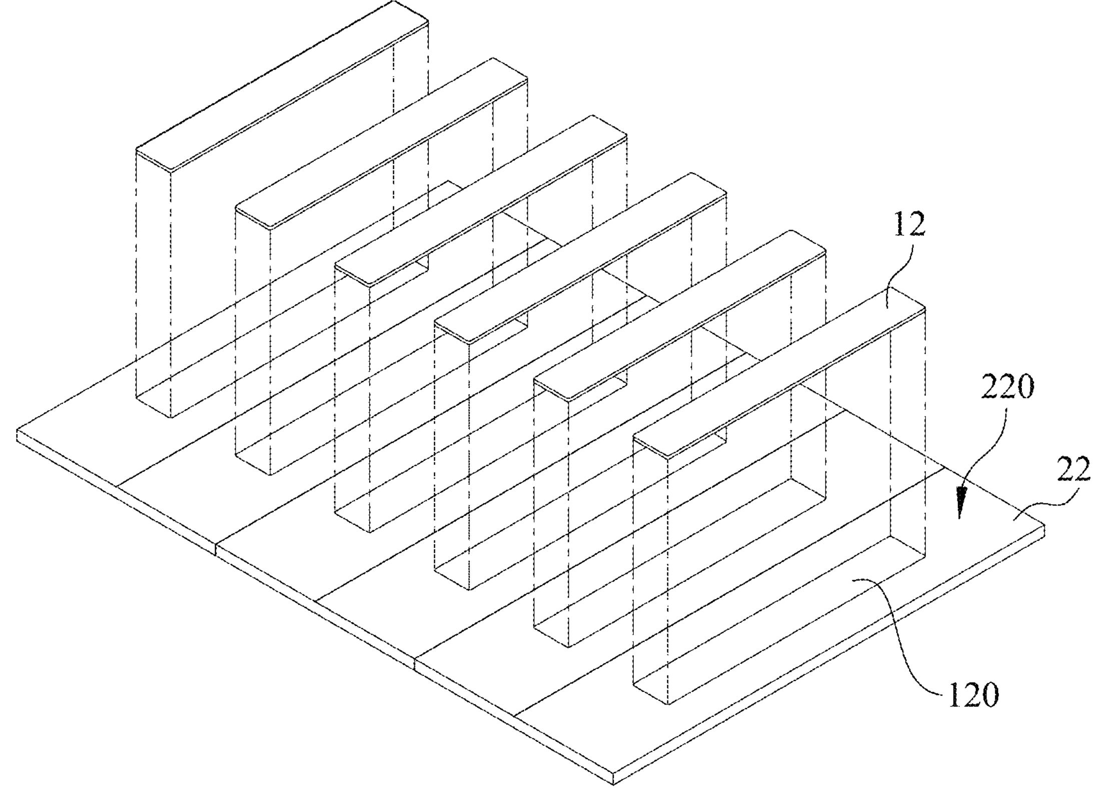
FIG. 4 is a schematic diagram of the stator yoke projection surface according to the embodiment of the present invention.

As shown in the schematic diagram of the approximately closed-loop magnetic circuit of the embodiment of the present invention in FIG. 3 and the schematic diagram of the stator yoke projection surface 120 of the embodiment of the present invention in FIG. 4, the number of the stator yokes 12 is the same as the number of magnets 22, the stator yoke projection surface 120 is formed on the surface of the magnet 22 corresponding to the stator yokes 12, and the area of the stator yoke projection surface 120 is smaller than the area of the corresponding magnet surface 220.

Specifically, the mover carrier 21 is suspended in the motor body through the elastic support element 31 and can swing freely. When the current flows through the coil group 11, a Lorentz force is generated. However, because the coil group 11 is fixed, the mover 2 will be displaced due to the reaction force generated by the Lorentz force; and the flexible circuit board 13 can control the direction of the current, thereby changing the displacement direction of the mover 2.

Furthermore, as shown in FIG. 3, the stator yoke 12 and the mover yoke 23 can converge closer the magnetic field lines 2210 to increase the intensity of the mover magnetic field, thereby increasing the electromagnetic thrust generated by the coil group 11. The stator yoke 12 forms an approximate closed-loop magnetic circuit on the side of the mover 2 near the coil group 11; the mover yoke 23 forms a closed-loop magnetic circuit on the side of the mover 2 away from the coil group 11.

As shown in FIG. 4, the stator yoke projection surface 120 can be located within the range of the magnet surface 220 to reduce the magnetic attraction between the stator yoke 12 and the magnet 22.

Figure 5:
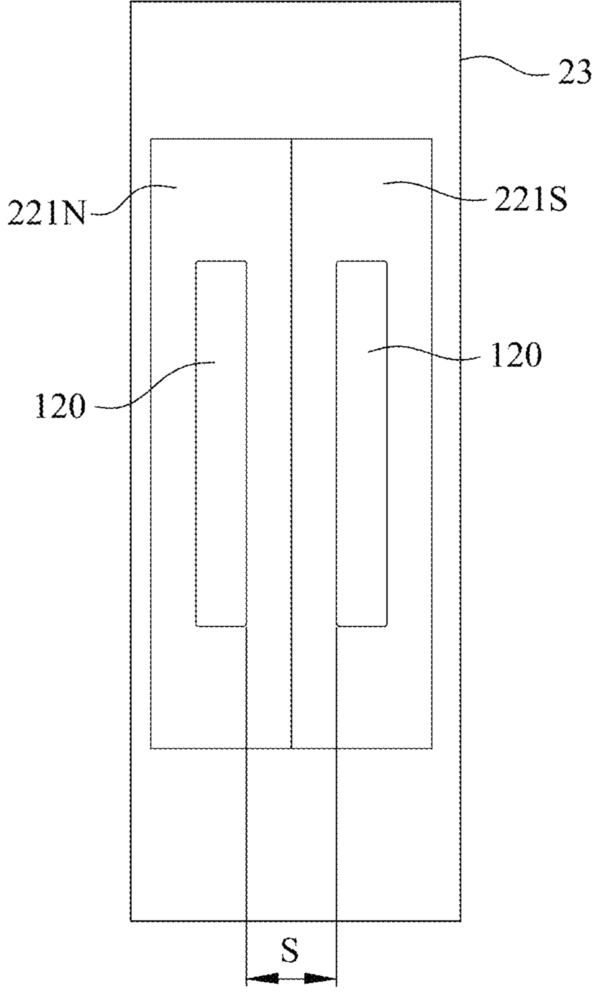
FIG. 5 is a schematic diagram of a simulation model according to an embodiment of the present invention.

Specifically, as shown in the schematic diagrams of the simulation model of the present invention in FIGS. 1, 4 and 5, taking a group of magnets 22 as an example, both N pole 221N and the S pole 221S of the magnet 221 have stator yoke projections surface 120 projected onto the magnet surface 220. The adjacent sides of the N pole 221N and the S pole 221S are the inner sides, and the opposite sides are the outer side. The distance between the two stator yoke projection surfaces 120 is the pitch S. Furthermore, the other surface of the magnet 22 facing the magnet surface 220 is connected to the mover yoke 23. Model 1 (DOE1) is a form in which the magnet 22 does not match the stator yoke 12, and model 6 (DOE6) is a form in which the magnet surface 220 is the same width as the stator yoke projection surface 120. Model 2 (DOE2) is that the outer side of the stator yoke projection surface 120 is aligned with the outer side of the magnet surface 220; model 3 (DOE3) is that the center of the two stator yoke projection surfaces 120 is aligned with the center of the magnet surface 220; model 4 (DOE4) is that the inner sides of the two stator yoke projection surfaces 120 are close to the inner sides of the magnet surfaces 220, but the two stator yoke projection surfaces 120 are not in contact; in model 5 (DOE5), the inner sides of the two stator yoke projection surfaces 120 are in contact with each other. The order of the spacing S in models 2 to 5 is: model 2>model 3>model 4>model 5=0.

Figure 6:
FIG. 6 is a line diagram of the magnetic attraction and the motor thrust with respect to the relative position between the projection surface of the stator yoke and the magnet surface of the simulation model according to the embodiment of the present invention.
Figure 6:
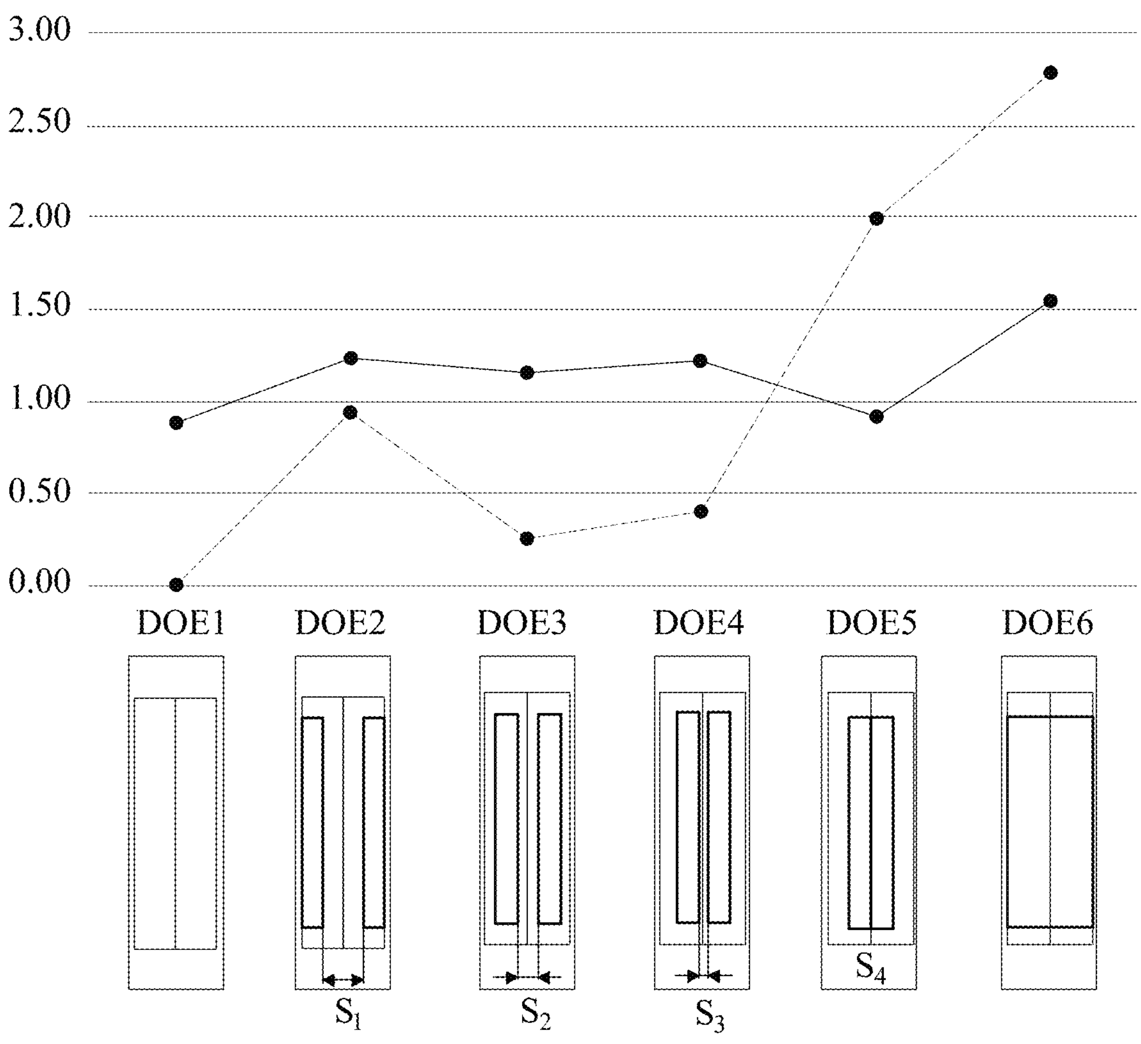
Figure 7:
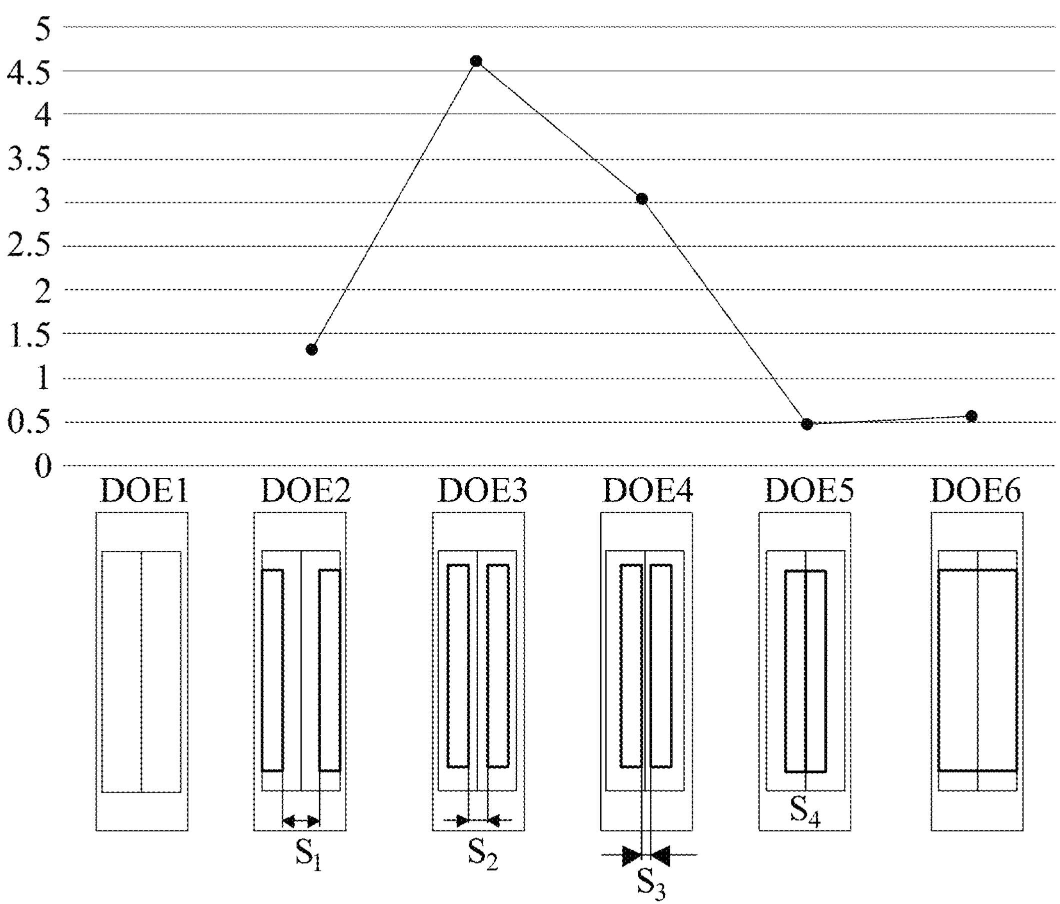
FIG. 7 is a line diagram showing the ratio of thrust force and magnetic attraction force of the simulation model.

As shown in the magnetic attraction force and the motor thrust line diagram with respect to the relative position of the stator yoke projection surface 120 and the magnet surface 220 in FIG. 6, under the aforementioned model conditions, model 1 does not have the magnetic attraction force because there is no stator yoke 12. As shown in FIG. 6, the order of the magnetic attraction of models 2 to 6 is: model 6>model 5>model 2>model 4>model 3. As shown in the line chart of the ratio of motor thrust to magnetic attraction in FIG. 7, the order of the ratios of models 2 to 5 is: model 3>model 4>model 2>model 6>model 5.

In summary, when all the other geometric relationship conditions between the magnet surface 220 and the stator yoke projection surface 120 are the same and when the geometric center of the stator yoke projection surface 120 coincides with the geometric center of the magnet surface 220, the maximum ratio of motor thrust to magnetic attraction can be achieved. On the other hand, when the stator yoke projection surface 120 is tangent to the edge of the magnet surface 220 or crosses the junction of the magnetic poles, the ratio of the motor thrust to the magnetic attraction force will be smaller, which implies that the suction force between the magnet 22 and the stator yoke 12 is relatively large. As such, excessive magnetic suction force may cause excessive deformation of the suspension device 3 in the normal direction of the magnet surface 220 and affect the performance of the motor body.

Preferably, there is no direct contact between adjacent magnets 22, so as to reduce the weight and increase the magnetic field coverage of the magnets 22.

Preferably, the magnetization direction of the magnets 22 is perpendicular to the magnet surface 220.

Preferably, the elastic support element 31 can be a plate-shape spring.

In a preferred embodiment of the present invention, the flexible circuit board 13 has an electronic control processing unit (not shown in the figure) for receiving external signals and adjusting the magnitude and flow direction of the current of the coil group 11.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A vibration motor with closed-loop magnetic circuit, comprising a motor body, which further comprising:

a stator fixed seat, further comprising:

a coil group, disposed inside the stator fixed seat;

a stator yoke, made of magnetically permeable material, connected to the stator fixed seat, and disposed on one side of the coil group; and a flexible circuit board, electrically connected to the coil group to supply and distribute current to the coil group;

a mover, disposed on the other side of the coil group relative to the stator yoke, and further comprising:

a mover carrier, connected to the stator fixed seat through a suspension device;

a magnet, connected to the mover carrier, a side of the magnet near the coil group forming a magnet surface; and a mover yoke, disposed on the side of the mover carrier away from the coil group; and the suspension device, further comprising: an elastic support element, with one end connected to the mover carrier to enable the mover to move back- and forth with respect to the stator fixed seat; and a fixed element, fixedly connected to the other end of the elastic support element and the stator fixed seat, and forming a gap between the mover and the coil group;

wherein the flexible circuit board provides a current to the coil group, and cooperates with a magnetic field of the mover generated by the magnet to form an electromagnetic thrust to move the mover; and wherein the stator yoke forms a stator yoke projection surface on the magnet surface of the corresponding magnet, and the area of the stator yoke projection surface is smaller than the area of the corresponding magnet surface.

2. The vibration motor with closed-loop magnetic circuit according to claim 1, wherein the stator yoke projection surface can be located inside the magnet surface of the corresponding magnet.

3. The vibration motor with closed-loop magnetic circuit according to claim 2, wherein the geometric center of the stator yoke projection surface overlaps the geometric center of the magnet surface to reduce the suction force between the stator yoke and the magnet.

4. The vibration motor with closed-loop magnetic circuit according to claim 1, wherein a plurality of magnets is disposed, the magnets are arranged in the same direction, and the adjacent magnet surfaces have opposite magnetic poles.

5. The vibration motor with closed-loop magnetic circuit according to claim 4, wherein the adjacent magnets are not in contact with each other.

6. The vibration motor with closed-loop magnetic circuit according to claim 5, wherein the magnetization direction of the magnet is perpendicular to the magnet surface.

7. The vibration motor with closed-loop magnetic circuit according to claim 5, wherein the elastic support element can be a flat strip spring.

8. The vibration motor with closed-loop magnetic circuit according to claim 5, wherein the flexible circuit board has an electronic control processing unit for receiving external signals and adjusting the magnitude and flow direction of the current.

* * * * *